US010766140B2

(12) United States Patent
Krasny et al.

(10) Patent No.: US 10,766,140 B2
(45) Date of Patent: Sep. 8, 2020

(54) TEACH MODE COLLISION AVOIDANCE SYSTEM AND METHOD FOR INDUSTRIAL ROBOTIC MANIPULATORS

(71) Applicant: Battelle Memorial Institute, Columbus, OH (US)

(72) Inventors: Darren Krasny, New Albany, OH (US); Zachary Schmid, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 315 days.

(21) Appl. No.: 15/789,032

(22) Filed: Oct. 20, 2017

(65) Prior Publication Data

US 2018/0297204 A1 Oct. 18, 2018

Related U.S. Application Data

(60) Provisional application No. 62/485,159, filed on Apr. 13, 2017.

(51) Int. Cl.
*B25J 9/16* (2006.01)
*G05B 19/409* (2006.01)
*G05B 19/427* (2006.01)

(52) U.S. Cl.
CPC ............ *B25J 9/1676* (2013.01); *B25J 9/163* (2013.01); *B25J 9/1671* (2013.01);
(Continued)

(58) Field of Classification Search
CPC ........ B25J 9/1671; B25J 9/1676; B25J 9/163; G05B 19/409; G05B 19/427;
(Continued)

(56) References Cited

U.S. PATENT DOCUMENTS 4,578,757 A * 3/1986 Stark ...................... A61B 6/102
250/363.02
4,644,237 A 2/1987 Frushour et al.
(Continued)

FOREIGN PATENT DOCUMENTS

WO 2010/049101 5/2010
WO 2012/143044 10/2012
WO 2014/143044 9/2014

*Primary Examiner* — Stephen Holwerda
(74) *Attorney, Agent, or Firm* — Diederiks & Whitelaw, PLC.

(57) ABSTRACT

A robot system includes a robot, a teach pendant having an operator interface, and a robot controller with a computer and associated hardware and software containing a virtual representation of the robot and the environment. The system employs a method for avoiding collisions including moving a manipulator arm along an actual path in an environment containing objects constituting collision geometry. Operator input is entered into the teach pendant, whereby the operator is able to directly control motion of the robot along the actual path. A recent history of the motion of the robot is recorded, and a predicted path of the robot is developed based on the input entered into the teach pendant and the recent history of the motion of the robot. Real-time collision checking between the predicted path and the collision geometry is performed while the operator manually controls the robot using the teach pendant.

18 Claims, 7 Drawing Sheets

(52) U.S. Cl.
CPC ......... *G05B 19/409* (2013.01); *G05B 19/427* (2013.01); *G05B 2219/35471* (2013.01); *G05B 2219/39082* (2013.01); *G05B 2219/39433* (2013.01); *G05B 2219/39434* (2013.01); *G05B 2219/39443* (2013.01); *G05B 2219/39445* (2013.01); *G05B 2219/40311* (2013.01); *G05B 2219/40317* (2013.01); *G05B 2219/49158* (2013.01)

(58) Field of Classification Search
CPC ........... G05B 2219/35471; G05B 2219/39082; G05B 2219/39433; G05B 2219/39443; G05B 2219/39445; G05B 2219/40311; G05B 2219/40317; G05B 2219/49158; G05B 2219/39434
See application file for complete search history.

(56) References Cited

U.S. PATENT DOCUMENTS

| | | | |
|---|---|---|---|
| 4,663,726 A * | 5/1987 | Chand | G05B 19/353 318/573 |
| 4,723,219 A | 2/1988 | Beyer et al. | |
| 4,922,430 A * | 5/1990 | Wavish | B25J 9/1666 700/255 |
| 5,056,031 A * | 10/1991 | Nakano | B25J 9/1676 700/178 |
| 5,150,452 A | 9/1992 | Pollack et al. | |
| 5,347,459 A * | 9/1994 | Greenspan | B25J 9/1666 345/424 |
| 5,548,694 A | 8/1996 | Frisken Gibson | |
| 5,687,295 A * | 11/1997 | Kaihori | B25J 9/1656 700/264 |
| 5,880,956 A | 3/1999 | Graf | |
| 6,678,582 B2 | 1/2004 | Waled | |
| 6,873,944 B1 | 3/2005 | Buttolo et al. | |
| 7,102,315 B2 | 9/2006 | Nakata et al. | |
| 7,373,220 B2 | 5/2008 | Watanabe et al. | |
| 7,391,178 B2 | 6/2008 | Tanaka et al. | |
| 7,765,031 B2 | 7/2010 | Nagamatsu | |
| 7,774,099 B2 | 8/2010 | Kobayashi et al. | |
| 8,255,083 B2 | 8/2012 | Weiss et al. | |
| 8,311,731 B2 | 11/2012 | Sugiura et al. | |
| 8,315,738 B2 | 11/2012 | Chang et al. | |
| 8,340,820 B2 | 12/2012 | Nair | |
| 8,355,818 B2 | 1/2013 | Nielsen et al. | |
| 8,374,718 B2 | 2/2013 | Takahashi et al. | |
| 8,996,174 B2 | 3/2015 | Brooks et al. | |
| 9,132,551 B2 | 9/2015 | Zhang et al. | |
| 9,144,904 B2 | 9/2015 | McGee et al. | |
| 9,296,106 B2 | 3/2016 | Schlaich et al. | |
| 9,345,544 B2 | 5/2016 | Hourtash et al. | |
| 9,643,316 B2 | 5/2017 | Krasny et al. | |
| 2006/0049939 A1 * | 3/2006 | Haberer | F16P 3/142 340/541 |
| 2006/0108960 A1 * | 5/2006 | Tanaka | B25J 19/06 318/568.21 |
| 2008/0021597 A1 * | 1/2008 | Merte | F16P 3/147 700/255 |
| 2009/0037033 A1 | 2/2009 | Phillips et al. | |
| 2009/0326711 A1 * | 12/2009 | Chang | B25J 9/1666 700/248 |
| 2011/0043515 A1 | 2/2011 | Stathis | |
| 2011/0264266 A1 * | 10/2011 | Kock | B25J 9/1676 700/253 |
| 2012/0061155 A1 | 3/2012 | Berger et al. | |
| 2012/0327190 A1 * | 12/2012 | Massanell | B25J 9/1676 348/46 |
| 2013/0178980 A1 | 7/2013 | Chemouny et al. | |
| 2015/0158178 A1 | 6/2015 | Burmeister et al. | |
| 2015/0217455 A1 * | 8/2015 | Kikkeri | B25J 9/1676 700/259 |
| 2015/0239121 A1 | 8/2015 | Takeda | |
| 2016/0059413 A1 | 3/2016 | Ogata | |
| 2016/0207199 A1 | 7/2016 | Kuffner, Jr. et al. | |

\* cited by examiner

TEACH MODE COLLISION AVOIDANCE SYSTEM AND METHOD FOR INDUSTRIAL ROBOTIC MANIPULATORS

CROSS-REFERENCE TO RELATED APPLICATIONS

This application claims the benefit of U.S. Provisional Application No. 62/485,159, which was filed on Apr. 13, 2017 and titled "Teach Mode Collision Avoidance System and Method for Industrial Robotic Manipulators". The entire content of this application is incorporated herein by reference.

FIELD OF THE INVENTION

The present invention pertains to the art of industrial robots and more specifically to controllers for robots operating in a manufacturing environment that prevent the robots from colliding with surrounding objects in their workspace.

BACKGROUND OF THE INVENTION

Robots are now commonplace in a typical manufacturing environment. Industrial robots are used in many industries for manufacturing products. For example, in the aerospace industry, robots have been employed to work on components such as wing assemblies and fuselages. Robots, provided with various end effectors and tools, are now moving work pieces around the manufacturing environment at considerable speed. As more robots are employed in the same manufacturing environment, the potential for a collision between a robot, or its tool or end-effector, and other objects in the robot's workspace or even other parts of the same robot increases. Any collision can cause considerable damage to the robot and other objects involved in the collision, resulting in extensive undesirable repair costs and down time in any manufacturing process associated with the robot.

When a robot is being programed for a new operation and the robot is first being brought online in a workspace, there are higher risks of collision than when a robot is already in operation. The robot is first programmed offline using computer-aided design (CAD) models of the robot and workspace. The path of a tool center point (TCP) of the robot's tool is programmed so that the robot can conduct a manufacturing operation. However, the simulated CAD model of the workspace may not be exactly the same as the actual workspace. To address this issue, most industrial robotic manipulators offer a manual mode, or "teach" mode, where the operator can control the robot using a teach pendant or similar remote control device. Teach mode operation is often used to "touch-up" or adjust offline-created robot programs to account for variation between simulated CAD models, which are employed by the offline programming software, and the as-built workspace. Teach mode operation is used frequently during commissioning of a new robotic workspace and creates a significantly higher risk of collision between the robot, tooling, work piece, and other components in the workspace because a human operator is directly in control of the robot. In some industries, such as aerospace, the high value of the work piece makes the risk of collision unacceptably high because rework is costly and production schedules are tight.

To prevent damage from collisions, some robot manufacturers offer collision detection methods that monitor current draw on each of the robot's joint axes to detect when each joint actuator is drawing more than a specified amount of current, possibly signifying a collision. However, normal acceleration and deceleration may also cause higher current draw, making this approach not entirely reliable, as the current monitoring sensitivity must typically be hand-tuned by the operator. Another option, offered by robot manufacturers, as shown in FIG. 1, is a zone-based monitoring feature 10 where the user can define simple polygonal keep-in and keep-out regions 20. During operation, a robot controller 30 monitors various elements 40 of a robot 50 as robot 50 moves relative to a work surface 60, both in teach mode and during normal operation, and immediately halts robot 50 when the robot's motion enters keep-out region 20 or leaves a keep-in region (not shown). However, this zone-based approach is limited in what types of environments it can monitor. Within the aerospace industry, large curved components such as wing assemblies or fuselages are common, which implies that simple zone-based approaches are not adequate for robotic collision avoidance during teach mode operation. Also, numerous aircraft have features like inlet ducts, and robotic end-effectors can be used for operations inside these ducts (e.g., coating or de-coating operations). It would be nearly impossible to protect such areas with a zone-based approach because there is a practical limit to the number of zones that can be defined, and each zone is a simple convex polyhedron that does not support complexities like holes (i.e., toruses are not an option). Other sensor-based approaches can involve outfitting a robot with touch sensors, which can be cost prohibitive to protect all parts of the robot. Non-contact sensors, like 3D laser scanners, could be used to scan the robot and its environment but might not always be able to see all parts of the robot due to "shadows," which occur when a part of the geometry is hidden from the sensor.

There exists a need in the art to prevent robots from colliding with surrounding objects of complex shape during a teach mode.

SUMMARY OF THE INVENTION

To address the limitations of both sensor-based and zone-based approaches, a new approach has been developed that involves predicting a robot's motion based on teach pendant commands, the robot's current state, and a recent history of past positions of the robot. In this approach, a personal computer is connected to a robot controller during teach mode operation to monitor the robot's motion and predict and prevent collisions. A simulated representation of the environment is used that is an accurate representation of the robot's actual workspace. This simulated representation can come from three-dimensional (3D) CAD models, 3D scan data, or a combination of both. The simulated representation of the environment is used to perform collision checks between the robot's current and predicted positions to determine whether a collision is imminent while an operator uses the teach pendant to control the robot. The robot system is able to avoid collisions while in teach mode. The teach mode preferably has several sub modes including a jog mode, a step mode, and a run mode, and the system works in all three modes.

In jog mode, the operator can press buttons on the teach pendant to move each joint of the robot. Alternatively, the operator can also use the buttons to move the tool around in the workspace. In either case, the software "listens" to the button presses, predicts where the robot will move over a time span of several milliseconds (the length of the time period being configurable), and performs collision checks on the robot's predicted path. If a collision is predicted, the robot's override speed is decreased from the desired speed set by the operator. As the robot continues to get closer to an obstacle, its override speed continues to decrease until it comes to a full stop. However, if the operator moves the robot in any direction that will not result in a collision (e.g., along a wall, if the wall is an obstacle, or back away from the wall), then the robot's speed is increased to allow motion in the indicated direction.

In general, in step mode, the operator can step through a teach pendant program by pressing a "step" button to put the robot in step mode, then a "forward" or "backward" key to command the robot to execute one step or line of code in the program at a time in the desired direction. In this mode, the software predicts the motion of the robot using its current state and its recent history. Although complete information regarding the robot's future actions is contained in the teach pendant program, this information is not always made accessible by robot manufacturers. For example, if the robot has been moving in a circular arc over the past several milliseconds (the length of the time period being configurable), the software will predict that the motion will continue along this circular path. This path will then be projected out by several seconds (again, configurable) and pre-checked for collisions. Any predicted collisions will reduce the override speed of the robot. If, however, the robot's motion begins to deviate from the predicted path, the software will "lose confidence" in its prediction and begin to rely on the nearest distance between any part of the robot and a collision geometry, where a collision geometry could be the environment or another part of the robot itself (e.g., it might be possible for the robot to crash the tool it is holding into its own base). If the nearest distance to a collision decreases beneath a predetermined first threshold (configurable), the robot's override speed is decreased from the desired amount set by the operator, eventually stopping the robot if it reaches a predetermined second, smaller threshold. If the robot is stopped before reaching the smaller threshold distance, the operator stops the program by releasing the shift key and/or dead-man. The operator can then either use the jog keys to manually retreat or execute another step mode command, possibly in reverse. If the robot has gotten closer than the smaller distance threshold, the user has to activate an override mode by pressing a virtual button on the teach pendant GUI while also holding the shift key and the dead-man. Preferably, password protection is used. This commands the software to enter an override mode. In this mode, the maximum speed of the robot is greatly reduced, allowing the operator to retreat from the collision state at very low speed. Once the robot is out of the collision state, the override mode can be disabled with the teach pendant GUI, and normal operation can resume.

In run mode, the operator can execute a teach pendant program similar to step mode, although the robot executes lines of code continuously until the user stops execution by releasing the teach pendant key. Otherwise, the prediction and collision avoidance works exactly like step mode, described above.

More specifically, the present invention is directed to a robot system, which preferably comprises a robot including a manipulator arm for moving along an actual path in an environment containing objects, with the objects and the robot constituting collision geometry. The robot preferably has a base and a manipulator al n configured to hold a tool. The base may comprise one or more joints, sometimes referred to as integrated axes, such as rotary or translational joints that are configured to position the manipulator arm at different locations within the environment. The manipulator arm has at least one joint to allow the tool to be placed in desired positions along the path. The robot is provided with a teach pendant including an operator interface configured to receive operator input entered into the teach pendant. The interface has a keypad with keys. An operator is able to directly control motion of the manipulator arm of the robot along the actual path or control any additional integrated axes by entering instructions with the keys.

The robot system is able to avoid collisions while in a teach mode. The teach mode preferably has several sub modes including a jog mode, a step mode, and a run mode, and the system works in all three modes.

In one embodiment, a controller is configured to reduce the speed of the robot when any component of the robot approaches the collision geometry such that collisions are prevented while the operator controls the robot directly using the keys in a jog mode. Similarly, the controller is configured to predict the motion of the robot when the operator controls the robot directly in a Cartesian mode, wherein the keys are configured to control the tool center point in Cartesian space.

In another embodiment, the robot is configured to move according to a program having program steps and acceleration parameters. The controller is further configured to predict the motion of the robot along the predicted path based on a current destination position of a current program step, a speed of the robot, and the acceleration parameters, and to reduce a speed of the robot as the robot approaches the collision geometry along the predicted path such that collisions are prevented.

In another embodiment, the teach pendant has a key, and the controller is configured to continuously execute steps of the program as long as the operator is pressing the key. A distance between the robot and a nearest point of collision along the predicted path is calculated while the operator is pressing the key, and the speed of the robot is reduced proportionally to the calculated distance.

In operation, the robot system, including a robot with a manipulator arm, a base that may comprise additional joints, a teach pendant having an operator interface, and a robot controller having a computer and associated hardware and software containing a virtual representation of the robot and the environment, employs the following method for avoiding collisions. The manipulator arm is moved along an actual path in an environment containing objects constituting collision geometry. Operator input is entered into the teach pendant whereby the operator is able to directly control motion of the robot along the actual path. A recent history of the motion of the robot is recorded. A predicted path of the robot is calculated based on the input entered into the teach pendant and the recent history of the motion of the robot. Real-time collision checking between components of the robot and the collision geometry is performed using the predicted path while the operator manually controls the robot using the teach pendant.

The method also preferably includes reducing a speed of the robot as the robot approaches the objects in the environment and preventing collisions while the operator controls the robot directly using the keys in a jog mode. The robot is moved according to a program having program steps and acceleration parameters, and the motion of the robot is predicted based on the current destination position of a current program step, a speed of the robot, and the acceleration parameters. A speed of the robot is reduced as any component of the robot approaches the objects in the environment such that collisions are prevented.

In another embodiment, the method includes moving the robot according to a program having program steps and predicting the motion of the robot as the robot executes each step of the program. Potential paths of a tool center point of the robot are calculated, and the required robot positions are compared to a history of actual positions. If a path is found to be sufficiently similar to the robot's actual motion, the robot's motion is projected into the future based on the path. A speed of the robot is reduced as any component of the robot is predicted to approach the objects in the environment such that collisions are prevented. A distance between the robot and a nearest point of collision between the robot and the collision geometry is calculated, and the speed of the robot is reduced proportionally to the calculated distance.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

Figure 1:
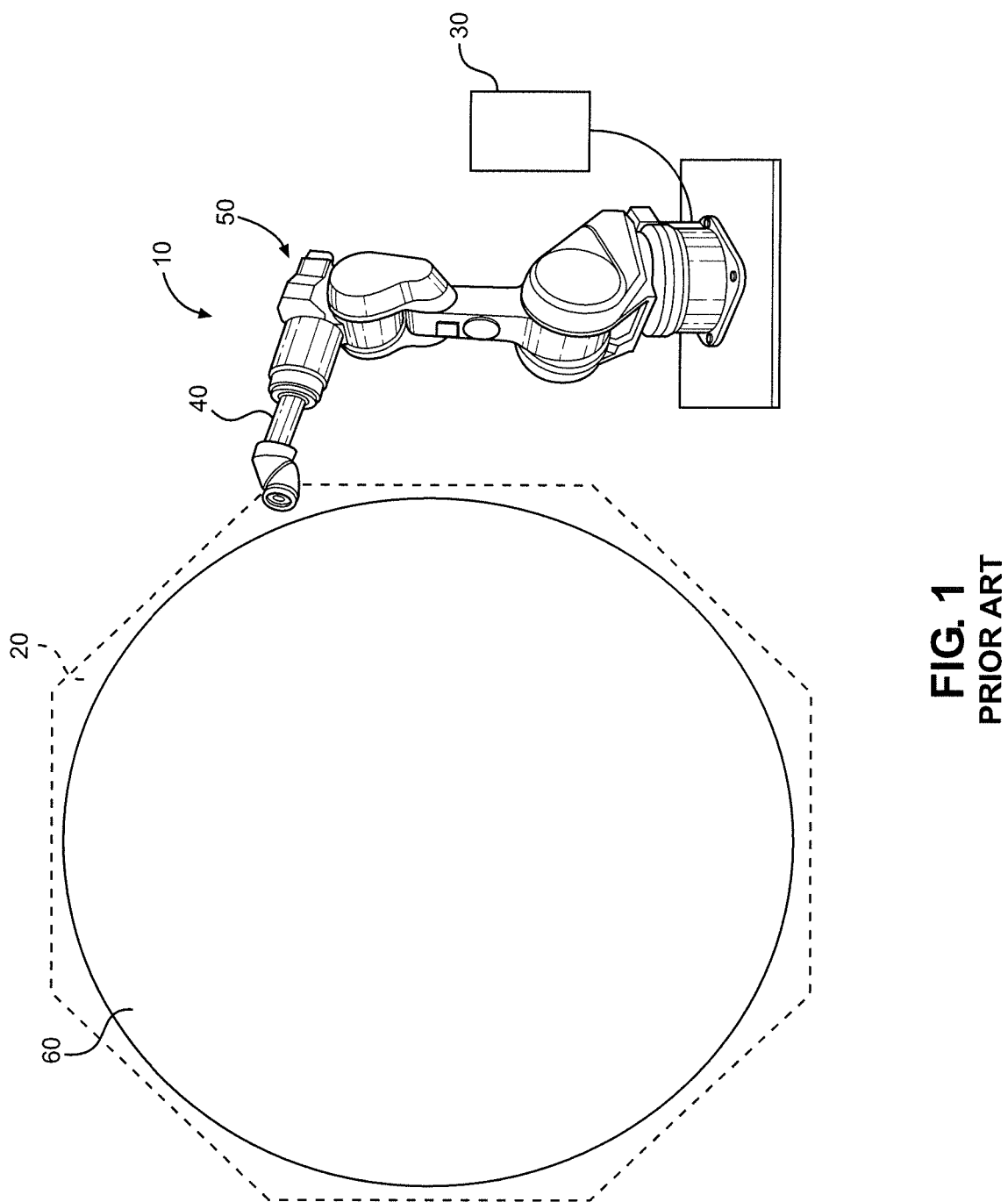
FIG. 1 is a schematic drawing of a robot system including a robot and a robot controller according to the prior art.
Figure 2:
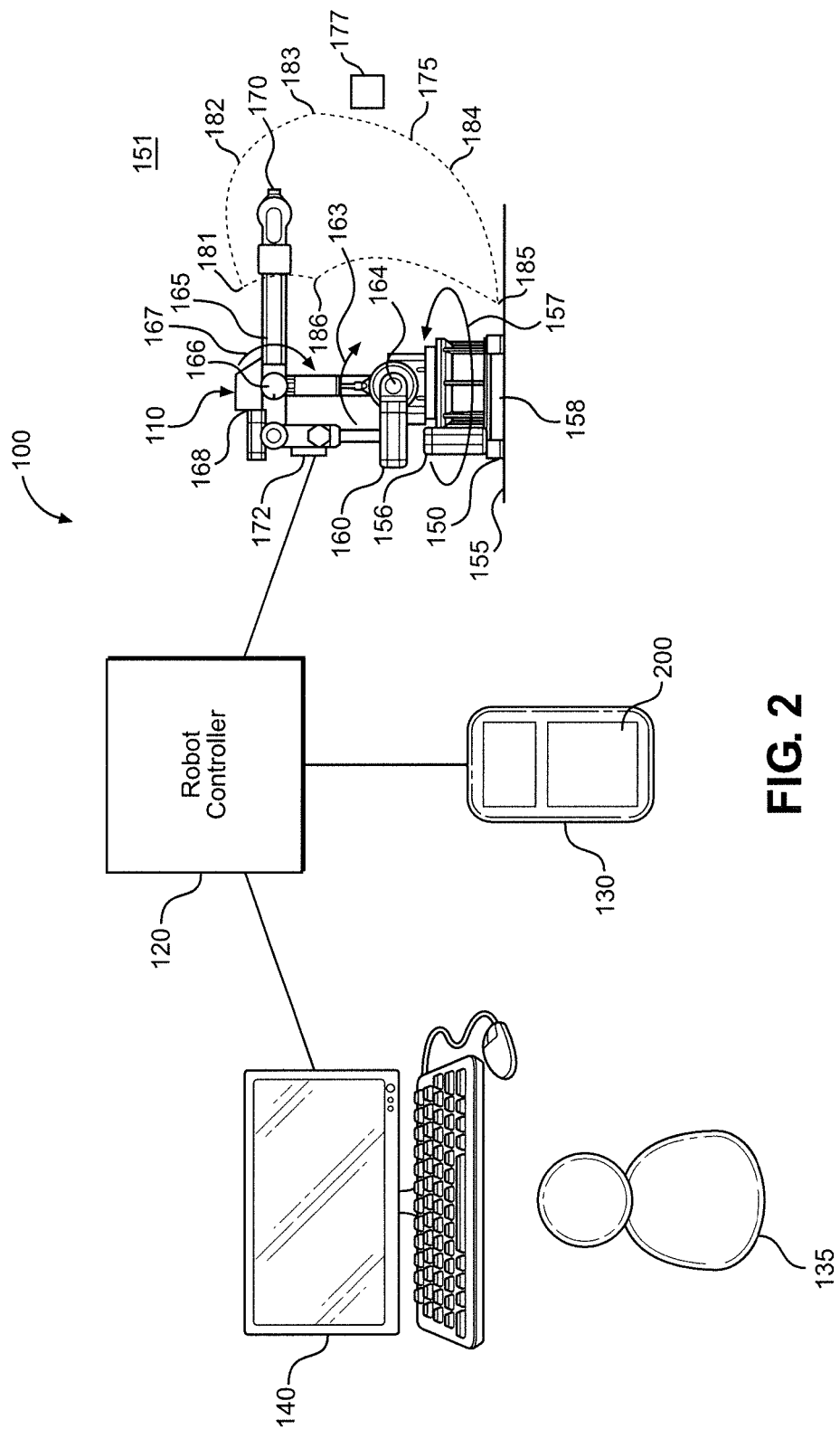
FIG. 2 is a schematic drawing of a robot system including a robot in accordance with a preferred embodiment of the invention.

With initial reference to FIG. 2, there is shown an overall robotic system 100 in accordance with a preferred embodiment of the invention. System 100 includes four main components: a robot 110; a robot controller 120; a teach pendant 130, which can be employed by an operator 135; and a personal computer 140. Robot 110 includes a base 150 mounted on a surface 155, such as a factory floor, in a workspace or work environment 151. Other configurations where the base comprises one or more translational or rotary stages are also possible but not shown. A lower support 156 is mounted on base 150 so that lower support 156 can rotate relative to base 150 about a first joint 158, as shown by an arrow 157. An upper support 160 is mounted to rotate relative to lower support 156 about a second joint 164, as shown by an arrow 163. Upper support 160 connects lower support 156 to a forearm link 165. The forearm link 165 is pivotably mounted to rotate about a third joint 166, as shown by an arrow 167, and is also designed to extend or retract relative to an arm support 168. So that robot 110 can move with six degrees of freedom, robot 110 also includes three revolute joints coincident at the wrist of forearm 165, although such joints are not clearly visible in FIG. 2. This arrangement allows an end effector or tool 170 to be placed in any desired position by various actuators, such as actuator 172. Based on the above, it should be understood that robot 110 includes a plurality of components, e.g., base 150, forearm 165 and tool 170. A component of robot 110, such as tool 170, is moved along an actual path 175 in environment 151, which contains objects 177, to various desired positions 181, 182, 183, 184, 185, and 186. Robot 110 and objects 177 constitute a collision geometry. Robot controller 120 can include a computer, or be connected to computer 140, that has associated hardware and software (not separately labeled). Preferably, the software runs on computer 140 and monitors the joint positions and joint velocities of robot 110. A commercially available software program, which can be modified in accordance with the invention, is Battelle's PathPlan™ software package.

Figure 3:
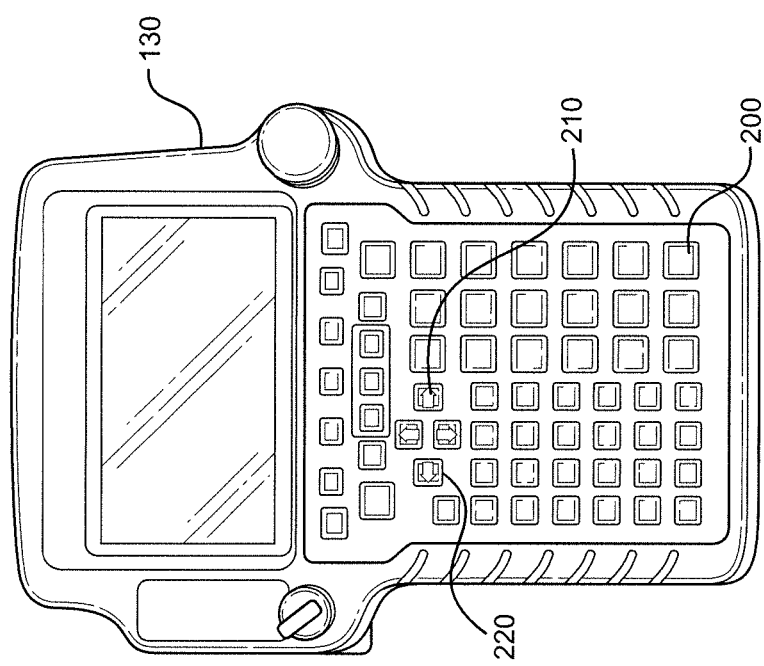
FIG. 3 shows a close-up view of a teach pendant from the robot system of FIG. 2.

As best seen in FIG. 3, teach pendant 130 includes an operator interface 200 with several keys including a forward key 210 and a backward key 220. During teach mode operation, several modes of controlling robot 110 are provided: a jog mode; a step mode; and a run mode. In jog mode, robot 110 can be moved around manually using teach pendant keys in operator interface 200. Individual joints 158, 164, 166 (as well as the joints coincident at the wrist of arm 165) can be moved in joint mode control, or the robot's tool center point 170 can be moved in Cartesian space in Cartesian mode control. Other teach pendant modes can also be used to control robot 110 using teach pendant 130, including step mode and run mode. In step mode, operator 135 can execute one line of the robot program in the desired direction by pressing forward key 210 or backward key 220 on teach pendant 130. In run mode, holding down forward or backward key 210, 220 causes multiple lines of code to execute in continuous succession until key 210, 220 is released.

Figure 4:
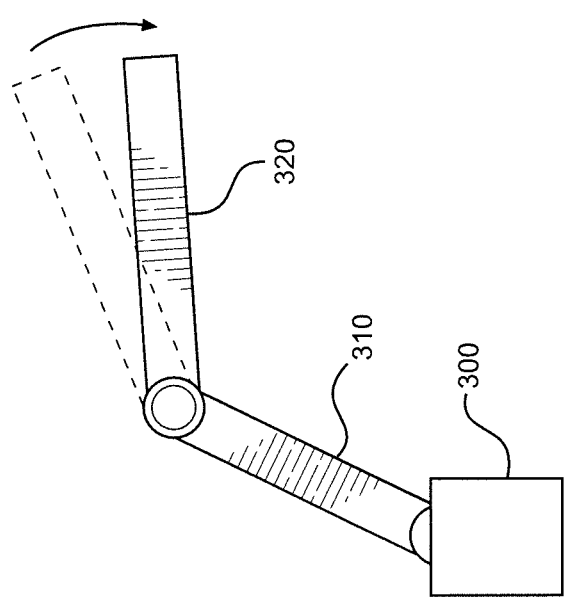
FIG. 4 shows a portion of a robot in accordance with the invention.

In jog mode, the control algorithm monitors the teach pendant keys being pressed by operator 135 and predicts the robot's motion accordingly. In joint mode, the algorithm projects the robot's motion by integrating the commanded joint rate of the specified axis to predict where individual links of robot 110 will travel. FIG. 4 shows a virtual representation of a robot arm. A base 300 pivotally supports an arm 310 which in turn supports an end effector 320. The position and motion of end effector 320 can be predicted in part based on the lengths of area 310 and end effector 320 and the angle formed between them (forward kinematics).

Figure 5:
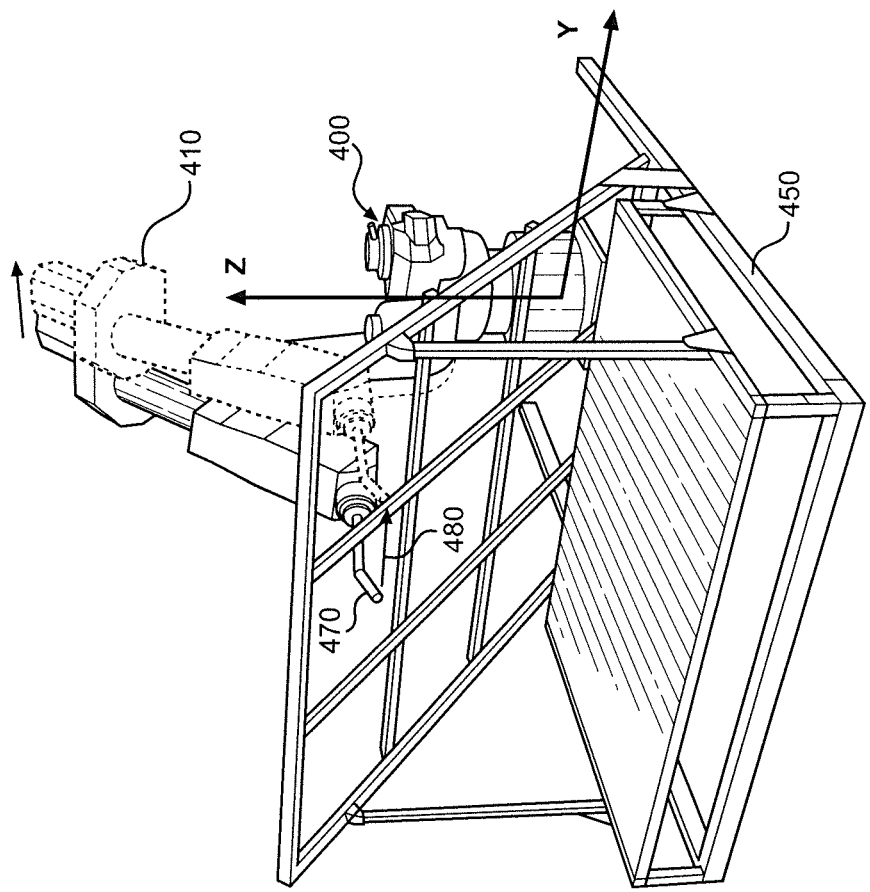
FIG. 5 shows a robot near a workpiece in accordance with the invention.

In Cartesian mode, the algorithm projects the path of the robot's motion in Cartesian space, as shown in FIG. 5. FIG. 5 shows a virtual representation of a robot 400 with a manipulator arm, such as an arm 410, near a workpiece 450. An end effector 470 is shown in solid at an initial position. Controller 120 is further configured to reduce a speed of arm 410 when arm 410 approaches the collision geometry (i.e., workpiece 450) such that collisions are prevented while operator 135 controls robot 400 directly using keys of operator interface 200 in jog mode. If robot 400 is being commanded to move in a straight line along the robot's y-axis (e.g., using a +Y key on teach pendant 130), the algorithm calculates this path and projects it out several seconds into the future. If the robot's position along this projected path, shown by an arrow 480, collides with anything, such as workpiece 450 or another obstacle, a rendering of robot 400 is presented on computer 140 warning of a potential collision, and the algorithm begins decreasing the speed of robot 400 from a desired speed through a range of override speeds. As robot 400 continues to approach workpiece 450, the override speed is decreased until robot 400 is halted. Motion that does not include a predicted collision (including motion that may be close to the workpiece but not toward it, e.g., along a straight edge) causes the algorithm to increase the speed of robot 400 back to the desired value. For example, moving robot 400 away from workpiece 450 would be done at the desired speed, while moving robot 400 toward workpiece 450 would be done at the override speeds.

Figure 6:
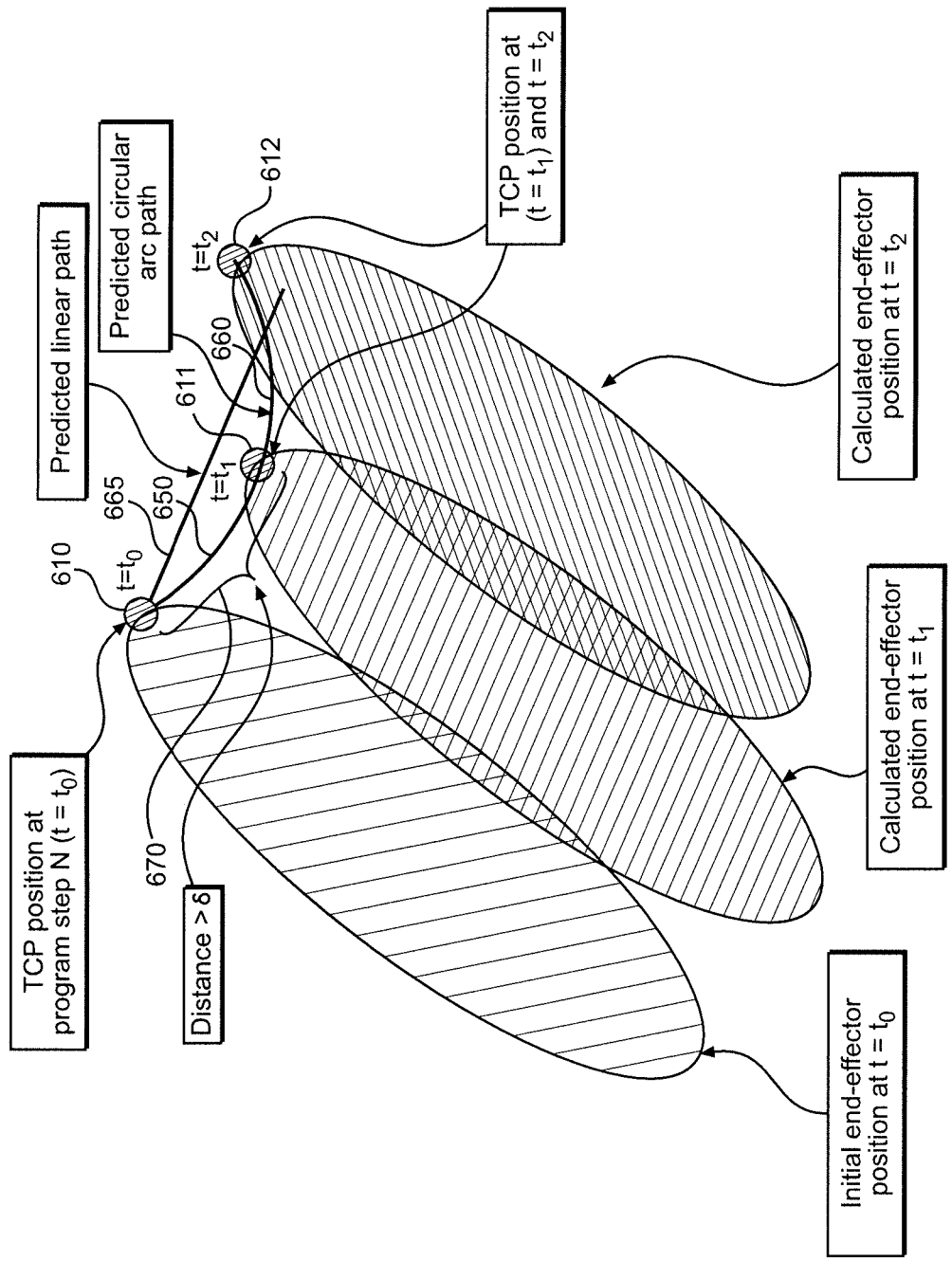
FIG. 6 shows the motion of a part of a robot in accordance with a preferred embodiment of the invention.

With reference to FIGS. 2 and 6, controller 120 is configured to record a recent history of the motion of tool 170 along an actual path 650 and associated positions of robot 110, develop a predicted path 660 for tool 170 in the virtual representation based on the input entered into pendant 130 and the recent history of the motion of tool 170, and perform real-time collision checking between predicted path, 660 and the collision geometry while operator 135 manually controls robot 110 using teach pendant 130. In step mode, operator 135 can sequentially execute each step or program line from a teach pendant program to check the robot's position at each point 611, 612. During this mode, when access to the teach pendant program commands is not possible, a path prediction approach is employed that uses a recent history of the robot's motion and compares it to the predicted motion to determine a confidence level in the algorithm's predictions, as shown in FIG. 6. For example, starting at the most recent program step N at time equal to an initial time $t_0$ in the teach pendant program at 610, the algorithm waits until the robot's tool center position has moved by two steps 611 and 612 along actual path 650, with at least a δ distance, shown at 670, between each step to filter out noise. Once the algorithm has sufficient data for three steps, it calculates a best-fit circular arc and best-fit linear segment to fit the tool center point samples. At each sample point, the algorithm then performs inverse kinematics to determine the required joint angles θ of robot 110 to achieve the calculated tool center point position. Because the initial joint angles $θ_0$ are known at $t_0$, only consistent inverse kinematic solutions are selected for $t_1$ and $t_2$ (e.g., alternate configurations where the elbow is flipped can be eliminated from consideration). The history of robot positions is then compared to the calculated positions to determine a similarity measure. Methods such as Dynamic Time Warping, commonly used for measuring similarity between two temporal sequences that may vary in speed, can also be used to analyze the history of the robot positions, especially if there are different numbers of samples between the actual robot data and the calculated robot data. If the two data streams are sufficiently similar, the selected path is used to predict the robot's motion by several seconds into the future and check for collisions. If a collision is predicted, the robot's speed is decreased from a desired speed to an override speed or through a range of override speeds. In FIG. 6, for example, circular path 660 best fits the data when compared to linear path 665, although the algorithm will only select this path if the actual robot position history is sufficiently like the calculated inverse kinematics solutions. If this is true, the algorithm has high confidence that circular path 660 is the true path.

Until the algorithm has sufficient data samples or if the algorithm cannot arrive at a confident prediction of the robot's path (e.g., the robot is executing a joint move where the tool center position path does not match either the linear 665 or circular arc 660 projected paths), the nearest distance between robot 110 and the collision geometries (including robot 110 itself) is used to modulate the robot's speed. If robot 110 is closer than a pre-specified threshold, the speed will be reduced towards zero. Once robot 110 is closer than a second, smaller threshold, the speed will be set to zero or sufficiently close to zero to eliminate risk of collision (e.g., 0.01%, which looks and feels to the operator like a dead halt). In run mode, path prediction is difficult because sufficient data is not always exposed by the robot manufacturer during robot operation. For this reason, the algorithm utilizes nearest distance to track how close robot 110 is to colliding with its environment or itself to modulate the robot's override speed, like step and jog modes.

Figure 7A:
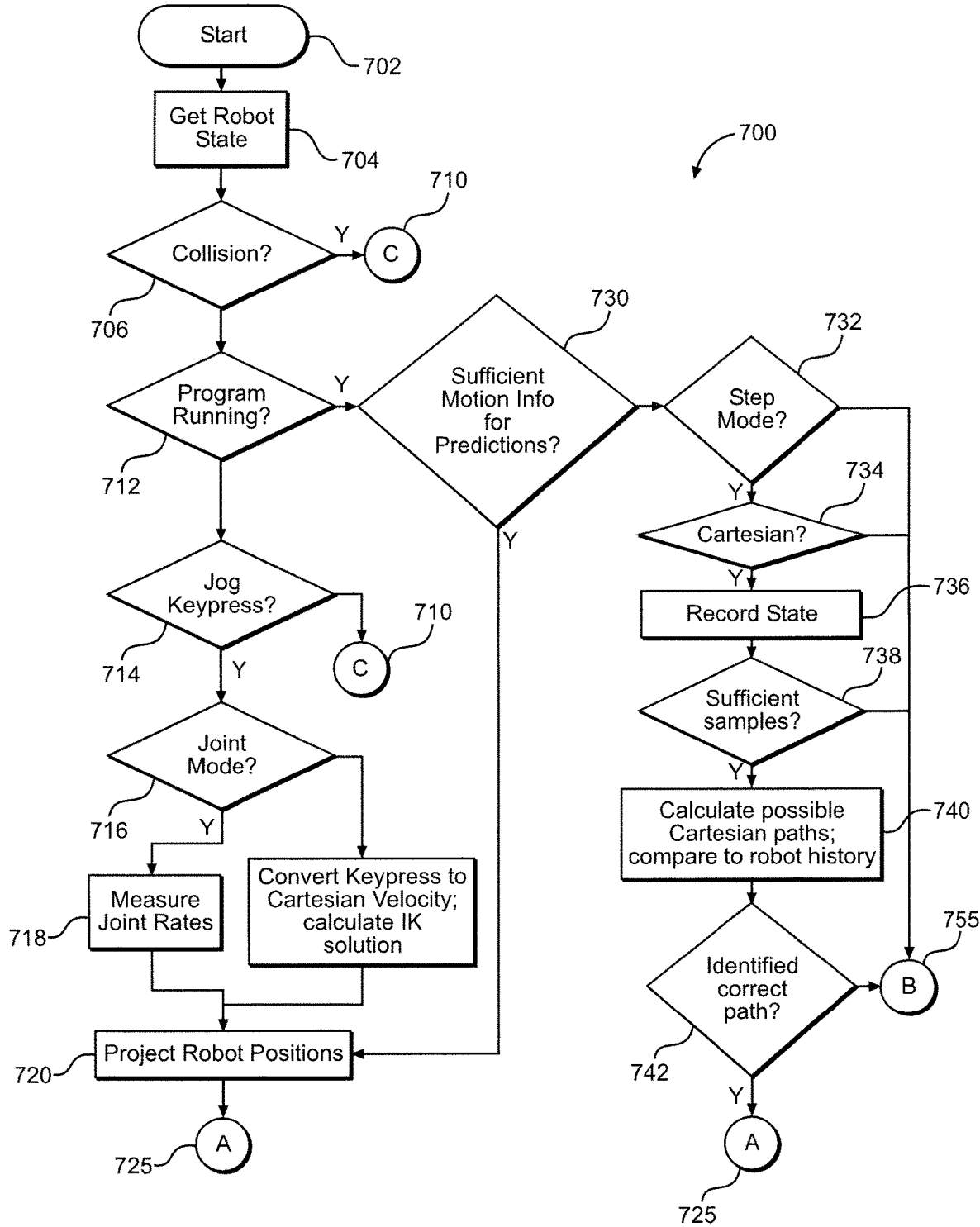
FIGS. 7A and 7B show a flowchart in accordance with a preferred embodiment of the invention.
Figure 7B:
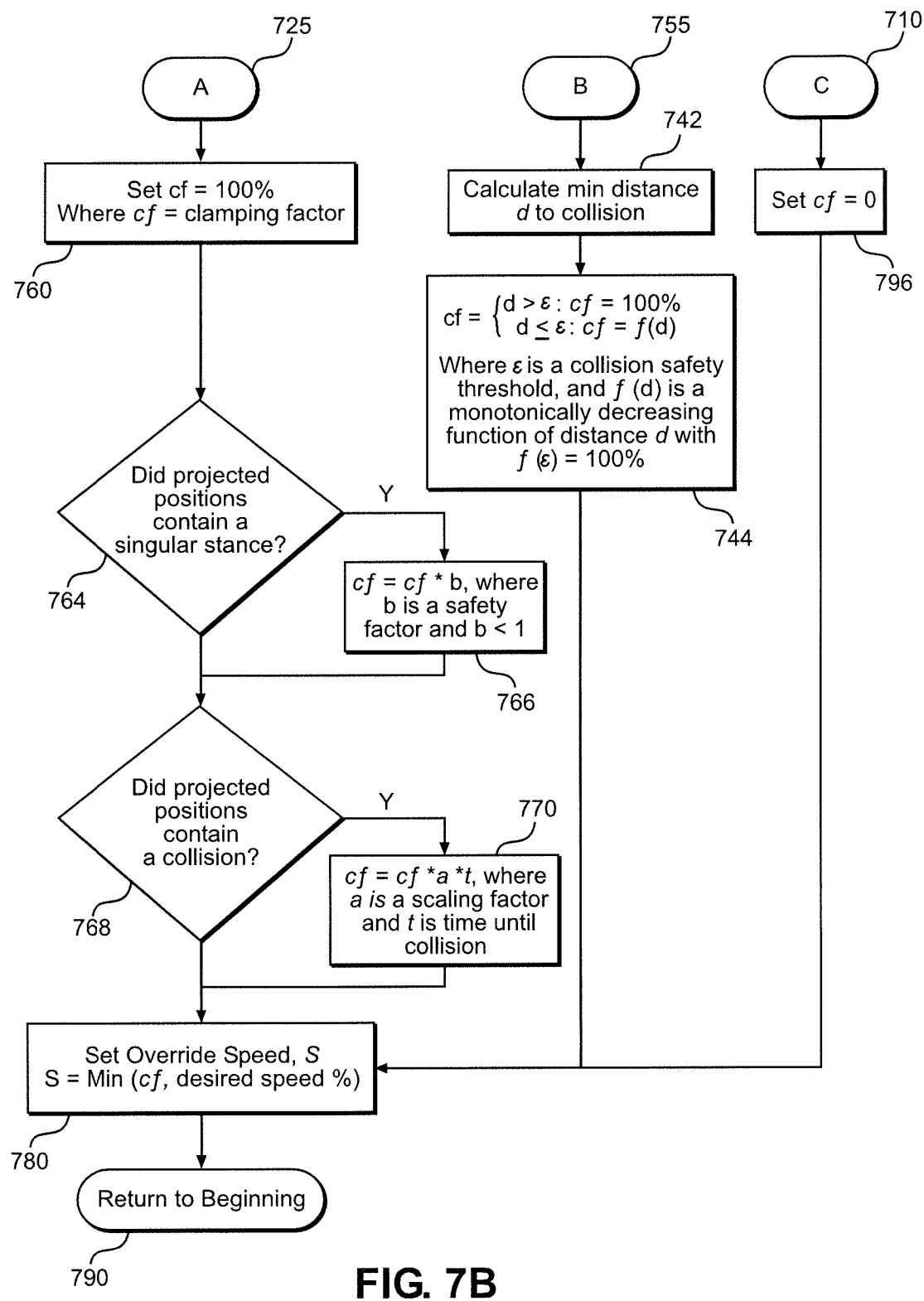

FIGS. 7A and 7B show a flowchart for a collision avoidance algorithm 700. Algorithm 700 operates in a loop where robot state data (joint positions and rates, control flags such as button presses, the program running flag, etc.) is obtained from robot controller 120 at each servo time step. The entire flowchart describes the action taken during one iteration of the loop and starts at a step 702. Once robot state data is obtained at 704, software algorithm 700 checks robot 110 against a simulated environment generated from 3D CAD and/or 3D scan data. If a collision is predicted at 706, the algorithm proceeds to step 710 and halts robot 110 by clamping the override speed S to 0 at step 796, as shown in the continuation of the flow chart in FIG. 7B. If no collision is predicted, algorithm 700 uses logical flags from controller 120 to determine at 712 if operator 135 is running a program on teach pendant 130, which would indicate either step or run mode. If not, operator 135 must be using jog mode, in which case algorithm 700 determines if a teach pendant jog button is being pressed (e.g., J1+, J1−, etc., where J1 is the robot's first, or base, joint). If no keys are being pressed at 714, robot 110 is maintained in the halted state by clamping the override speed to 0 (Path C at 796 in FIG. 7B). If a jog button is pressed, algorithm 700 determines at 716 whether joint mode is being used by looking at the associated logical flag from controller 120. In joint mode, joint rates are measured from the controller data at 718. In Cartesian mode, the tool center point is moved linearly in Cartesian space by operator 135 using the keys of operator interface 200. The keypress is converted to a direction, then inverse kinematics is performed to determine calculated joint rates that can be used to determine projected robot positions 720. Controller 120 is configured to predict the motion of the arm or tool center point when operator 135 controls robot 110 directly in the Cartesian mode. In both joint and Cartesian modes, the robot's position is projected out into the future at 720 based on the calculated or measured joint rates and passed to the next part of the algorithm at 725 (shown in FIG. 7B).

The other major path shown in FIG. 7A is for step and run modes. Robot 110 is configured to move tool 170 according to a program having program steps and acceleration parameters, and controller 120 is configured to predict the motion of tool 170 along predicted path 660 based on a current destination position of a current program step, a speed of tool 170, and the acceleration parameters. Controller 120 is further configured to reduce a speed of tool 170 as any component of robot 110 approaches collision geometry along predicted path 660 such that collisions are prevented. If a program is running, then algorithm 700 determines if sufficient motion planning data is available from robot controller 120 at 730. This can include the current program step, the current destination position of robot 110, acceleration and deceleration parameters, etc. If this information is available, then an accurate prediction of the robot's motion is possible, and the robot positions are projected into the future at 720 and passed to the Path A portion of the algorithm, shown in FIG. 7B, at 725. If this data is not available at 730, which is the more general case, then algorithm 700 determines which mode, step or run, is active at 732. If run mode is active, algorithm 700 moves to 755 and resorts to using the minimum calculated distance to a collision between robot 110, environment 151, and itself at a step 742, which is shown in Path B of FIG. 7B. Once the minimum distance is calculated at step 742, the clamping factor is decreased based on a monotonically decreasing function if the minimum distance is less than a configuration threshold at 744. If step mode is active at 732, however, algorithm 700 then determines whether joint mode or Cartesian mode is active based on control flags at 734. If joint mode is active, algorithm 700 resorts to the minimum distance approach at 755 as there will be no well-defined path evident in Cartesian space. If Cartesian mode is active at 734, however, the robot's current state is recorded at 736, and algorithm 700 then determines whether enough samples have been recorded to predict the robot's motion at 738. As discussed previously, predicting a line 650 or circular arc 665 generally requires a minimum number of samples for a high-quality estimate, although the actual number depends on the motion options available to robot 110, the robot's control algorithm 700, and the amount of noise in the samples. If insufficient samples are available, algorithm 700 resorts to the minimum distance approach at 755. If there are sufficient samples, at 740, algorithm 700 best fits the various motion options (e.g., linear, circular, etc.) to the samples, calculates the required inverse kinematic solutions to achieve these samples based on a known starting state, and compares each set of inverse kinematic solutions to the actual history of robot joint positions. If, at 742, one set of calculated inverse kinematic solutions is sufficiently like the actual history of robot positions, algorithm 700 has high confidence that robot 110 will be executing the associated path. The projected inverse kinematic solutions are then passed at 725 to Path A in FIG. 7B and checked for singularities and collisions, similar to the jog mode discussed above. If no calculated path is sufficiently similar to the actual history of robot positions, then algorithm 700 resorts to the minimum distance approach described in Path B of FIG. 7B. Once all paths of algorithm 700 have been completed, the execution returns to the beginning at 702, where new data is obtained from controller 120.

Generally, in Paths A, B, and C in FIG. 7B, a clamping factor is calculated that is used to clamp the desired override speed to a safe value. In Path A, the clamping factor is set to 100% at 760, and then the projected positions are checked for singularities at 764. Singularities are important because, at these positions in the robot's workspace 151, the robot's motion is more difficult to predict as robot controller 120 may handle each robot singularity differently, and there is generally insufficient information from controller 120 to determine what will happen. In addition, around singularities, the robot's joints may move very quickly, making it more difficult to prevent collisions. To mitigate these risks, the robot's speed is automatically reduced around singularities at 766 to prevent the robot's joints from moving too quickly and to provide algorithm 700 with additional time to react.

Once the singularity check is complete along Path A, algorithm 700 then checks the projected robot positions for potential collisions at 768. If any are detected, the clamping factor is reduced based on the time until the impending collision at 770. The closer in time that a collision would occur, the greater the reduction. Various function profiles are possible, including nonlinear functions, although the simplest case of a linear function is shown in FIG. 7B. After the collision check is complete, the clamping factor is then passed to the final block where it is used to clamp the desired override speed of robot 110. If the clamping factor is 100%, meaning that no singularities or collisions were detected, then the override speed is set equal to the desired speed at 780. If the clamping factor has been reduced, the desired speed is clamped to this value only if the desired speed exceeds this value. This means that operator 135 can jog robot 110 at the desired speed if that speed is considered "safe", i.e., it is below the clamping factor. Algorithm 700 then returns, at a step 790, to the beginning (step 702).

Although described with reference to preferred embodiments of the invention, it should be readily understood that various changes and/or modifications can be made to the invention without departing from the spirit thereof. For instance, while reference has been made to controlling robots working on parts of an aircraft in the aerospace industry, the invention is applicable to any moving robot having parts that could be involved in a collision. In general, the invention is only intended to be limited by the scope of the following claims.

We claim:

1. A robot system comprising:
   a robot including a manipulator arm designed to carry a tool or part along an actual path in an environment containing objects, the objects, the robot, and the tool or part constituting collision geometry;
   a teach pendant including an operator interface configured to receive operator input entered into the teach pendant, whereby an operator is able to directly control motion of the robot along the actual path; and
   a robot controller, said controller including a virtual representation of the robot and the environment and being configured to:
   record a history of the motion of the robot along the actual path,
   develop a predicted path of the robot in the virtual representation based on the input entered into the teach pendant and the history of the motion of the robot, and
   perform real-time collision checking by projecting the robot's future motion along the predicted path and checking between the robot at predicted robot positions on the predicted path and the collision geometry while the operator manually controls the robot using the teach pendant.

2. The system according to claim 1 wherein the operator interface has keys for receiving the operator input.

3. The system according to claim 2 wherein the controller is further configured to reduce a speed of the robot when any component of the robot approaches the collision geometry such that collisions are prevented while the operator controls the robot directly using the keys in a jog mode.

4. The system according to claim 2 wherein the robot has at least one joint, and one of the keys is configured to control the at least one joint.

5. The system according to claim 2 wherein the arm carries a tool and the tool has a tool center point, the controller is further configured to predict the motion of the robot when the operator controls the robot directly in a Cartesian mode, and the keys are configured to control the tool center point in Cartesian space.

6. The system according to claim 1 wherein the robot is configured to move according to a program having program steps and acceleration parameters, and the controller is further configured to predict the motion of the robot along the predicted path based on a current destination position of a current program step, a speed of the robot, and the acceleration parameters, and to reduce the speed of the robot as any component of the robot approaches the collision geometry along the predicted path such that collisions are prevented.

7. The system according to claim 1 wherein the robot is configured to move according to a program having program steps, the arm carries a tool and the tool has a tool center point.

8. The system according to claim 7 wherein the controller is further configured to predict the motion of the tool as the robot executes each step of the program by:
   calculating potential paths of the tool center point,
   comparing predicted robot positions along each potential path to a history of actual robot positions along the actual path, and, if one of the potential paths is found to be sufficiently similar to the actual path, designating the one of the potential paths as the predicted path to project the robot's future motion along the predicted path and to reduce a speed of the robot as any component of the robot is predicted to approach the collision geometry such that collisions are prevented.

9. The system according to claim 7 wherein the teach pendant has a key, and the controller is further configured to:
   continuously execute steps of the program as long as the operator is pressing the key;
   calculate a distance between the robot and a nearest point of collision along the predicted path while the operator is pressing the key; and
   reduce the speed of the robot proportionally to the calculated distance.

10. The system according to claim 2 wherein the controller is further configured to:
    calculate a distance between the robot and a nearest point of collision along the predicted path while the operator is pressing one of the keys; and
    reduce the speed of the robot proportionally to the calculated distance.

11. A method for operating a robot system including a robot with a manipulator arm, a teach pendant including an operator interface having keys, and a robot controller containing a virtual representation of the robot and an environment, said method comprising:
    moving the robot along an actual path in the environment containing objects constituting collision geometry;
    receiving operator input entered into the teach pendant, whereby the operator is able to directly control motion of the robot along the actual path;
    recording a history of the motion of the robot;
    developing a predicted path of the robot based on the input entered into the teach pendant and the history of the motion of the robot; and
    performing real-time collision checking by projecting the robot's future motion along the predicted path and checking between the robot at predicted robot positions on the predicted path and the collision geometry while the operator manually controls the robot using the teach pendant.

12. The method according to claim 11 further comprising reducing a speed of the robot as the robot approaches the collision geometry and preventing collisions while the operator controls the robot directly using the keys in a jog mode.

13. The method according to claim 11, wherein the robot includes a joint and further comprising receiving the operator input and controlling the joint with one of the keys.

14. The method according to claim 11, wherein the manipulator arm has a tool with a tool center point, further comprising predicting the motion of the robot when the operator controls the robot directly in a Cartesian mode and controlling the tool center point in Cartesian space.

15. The method according to claim 11 further comprising:
    moving the robot according to a program having program steps and acceleration parameters;
    predicting the motion of the robot based on a current destination position of a current program step, a speed of the robot, and the acceleration parameters; and
    reducing the speed of the robot as any component of the robot approaches the collision geometry such that collisions are prevented.

16. The method according to claim 11 further comprising moving the robot according to a program having program steps.

17. The method according to claim 16 further comprising predicting the motion of the robot as the robot executes each step of the program by:
    calculating potential paths of a tool center point of the robot,
    comparing predicted robot positions along each potential path to a history of actual robot positions along the actual path, and, if one of the potential paths is found to be sufficiently similar to the actual path, designating the one of the potential paths as the predicted path to project the robot's motion into the future along the predicted path and to reduce a speed of the robot as any component of the robot is predicted to approach the collision geometry such that collisions are prevented.

18. The method according to claim 11 further comprising:
    continuously executing steps of a program as long as the operator is pressing the key;
    calculating a distance between the robot and a nearest point of collision along the predicted path while the operator is pressing the key; and
    reducing the speed of the robot proportionally to the calculated distance.

* * * * *